US012182732B2

(12) United States Patent
Song et al.

(10) Patent No.: US 12,182,732 B2
(45) Date of Patent: Dec. 31, 2024

(54) AUTOMATED DECISION PLATFORM

(71) Applicant: PayPal, Inc., San Jose, CA (US)

(72) Inventors: Lin Song, Singapore (SG); Xin Li, Shanghai (CN); Chun Kiat Ho, Singapore (SG); Yuehao Wu, Cupertino, CA (US); Kai Xie, Singapore (SG); Meng Zang, Shanghai (CN); Chinmayee Rathi, Sunnyvale, CA (US); Jun Yang, San Jose, CA (US); Ke Zheng, Shanghai (CN); Zhenyin Yang, Saratoga, CA (US); Wen Lu, Shanghai (CN)

(73) Assignee: PayPal, Inc., San Jose, CA (US)

( * ) Notice: Subject to any disclaimer, the term of this patent is extended or adjusted under 35 U.S.C. 154(b) by 778 days.

(21) Appl. No.: 17/314,810

(22) Filed: May 7, 2021

(65) Prior Publication Data

US 2021/0350262 A1  Nov. 11, 2021

(30) Foreign Application Priority Data

May 8, 2020 (WO) ................. PCT/CN2020/089187

(51) Int. Cl.
*G06N 5/04* (2023.01)
(52) U.S. Cl.
CPC ...................................... *G06N 5/04* (2013.01)
(58) Field of Classification Search
CPC ....... G06N 5/04; G06N 5/022; G06Q 20/4016
See application file for complete search history.

(56) References Cited

U.S. PATENT DOCUMENTS

| 8,234,231 | B2 | 7/2012 | Kelly |
| 9,378,195 | B2 | 6/2016 | Bernelas et al. |
| 9,733,901 | B2 | 8/2017 | Bernelas et al. |
| 2013/0085977 | A1 | 4/2013 | Junker |
| 2014/0195306 | A1 | 7/2014 | Bernelas et al. |
| 2015/0370232 | A1 | 12/2015 | Kohn et al. |
| 2017/0132522 | A1 | 5/2017 | Junker |

FOREIGN PATENT DOCUMENTS

| CN | 104915717 A | * | 9/2015 |
| CN | 109101236 A | | 12/2018 |
| CN | 109831478 A | * | 5/2019 |

OTHER PUBLICATIONS

International Search Report and Written Opinion in PCT Appl. No. PCT/CN2020/089187 mailed Feb. 8, 2021, 9 pages.

* cited by examiner

*Primary Examiner* — Pei Yong Weng
(74) *Attorney, Agent, or Firm* — Kowert, Hood, Munyon, Rankin & Goetzel, P.C.; Dean M. Munyon (57) ABSTRACT

A computer system receives a set of user-defined rules are that useable by a computer service to automate a decision flow. The computer system generates a graph model from the user-defined rules. From the graph model, the computer system determines an input dependency model that is indicative of a set of inputs referred to in the graph model. The input dependency model is useable by an orchestrator to coordinate accesses to the one or more data stores in which the set of inputs is stored. The computer system receives the set of inputs and determines one or more automated decisions by applying the set of inputs to the graph model.

20 Claims, 7 Drawing Sheets

```
ruleset "a_ruleset_for_packages" : {
        vars : {
                brand = $taxi_brand : string
                price = $taxi_price : double // import a variable of type double
        }

// you can use package to group rules of the same kind or same purpose
        package "filter" : {
                rule "filter out" : {
                        if:
                                brand is "Modern Hardware"
                        then:
                                package.put("no-go", true) // write an
                                intermediate output
                }
        } package "a_pkg_name" : {
                vars : {
                        no_go = package("filter").get("no-go") // reference an
                                intermediate output from other package
                } rule "your rule name" : {
                        if:
                                not no_go and
                                price >= 0.0 // an overall condition
                                case "price is cheap": // only one of the case will be
                                        matched
                                        price < 10.00
                                then:
                                        result.put("price", "cheap")
                                case "price is affordable":
                                        price >= 10.00 and price < 20.00
                                then:
                                        result.put("price", "affordable")
                                case "price is expensive":
                                        price > 20.00
                                then:
                                        result.put("price", "expensive")
                }
        }
}
```

AUTOMATED DECISION PLATFORM

RELATED APPLICATIONS

The present application claims priority to PCT Appl. No. PCT/CN2020/089187, filed May 8, 2020, which is incorporated by reference herein in its entirety.

BACKGROUND

Technical Field

This disclosure relates generally to automated decision flows based on user-defined rules, and more particularly to optimizing execution of automated rules according to various embodiments.

Description of the Related Art

Computer-implemented automated decision processes are used to automate decisions according to rules defined by users. The decisions made by the computer system can subsequently be evaluated (e.g., for accuracy, for reliability, etc.) and changed by a user. Different sets of rules may lead to different results under different circumstances, so it may be advantageous to add, remove, or change rules to fit various circumstances or to run multiple automated decision processes simultaneously (e.g., different automated decision processes for different regions).

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to receive" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" automated decision platform would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "platform" refers to an environment that includes a set of resources that enables some functionality (for example, in the context of the present disclosure, automated decision making). In some cases, this set of resources may be software resources, such that a platform may be said to be constituted solely of software. In other instances, the set of resources may include software and the hardware on which the software executes. Still further, the resources may constitute specialized hardware that performs the functionality; such specialized hardware may, in some cases, utilize firmware and/or microcode in order to execute. ("Modules" are one type of resource; a given module is operable to perform some portion of the overall functionality of a platform.) The term "platform" is thus a broad term that can be used to refer to a variety of implementations. Unless otherwise stated, use of the term "platform" in this disclosure will be understood to constitute all possible types of implementations unless otherwise stated. Note that a platform need not be capable by itself of performing the specified functionality. Rather, it need only provide the capability of performing the functionality. For example, an automated decision-making platform according to the present disclosure provides resources for performing automated decision making; users may utilize the platform to carry out instances of automated decision making. Embodiments of the automated decision-making platform described herein thus enable the functionality of automated decision making to be performed.

As used herein, a "module" refers to software and/or hardware that is operable to perform a specified set of operations. A module may in some instances refer to a set of software instructions that are executable by a computer system to perform the set of operations. Alternatively, a module may refer to hardware that is configured to perform the set of operations. A hardware module may constitute general-purpose hardware as well as a non-transitory computer-readable medium that stores program instructions, or specialized hardware such as a customized ASIC.

DETAILED DESCRIPTION

Automated decision flows may be employed in a wide variety of computing applications. For example, in the context of electronic payment transactions, one or more automated decision flows may be used in order to determine whether a transaction should be executed or denied. An automated flow may be used to calculate a risk decision for a transaction—e.g. whether a risk of fraud is sufficiently low that the transaction should be allowed. Automated decision flows may also be used for purposes of compliance—e.g., if an automated decision indicates a high probability that a transaction may be a money laundering transaction, or is otherwise prohibited by law or regulation, then the transaction may also be denied. Automated decision flows may also be used to generate recommendations to present to users. In various instances, multiple automated flows can be present for a single task, such as execution of a transaction. The inventors have recognized various deficiencies in previous implementations of automated decision flows including: (a) when rules or functions that are parts of an automated decision flow are added, removed, or changed the added or changed rules or functions or in some instance the entire ruleset must be compiled, (b) data dependencies of the automated decision flow are not transparent such that orchestration can be used to control access to the data stores in which such data is stored leading to random accesses rather than more efficient controlled accesses, and (c) in various instances applications implementing automated decision flows are designed to operate in a particular computing environment (e.g., running on a particular operating system) and cannot be run in other computing environments. Techniques according to the present disclosure may ameliorate one or more of these shortcomings.

Figure 1:
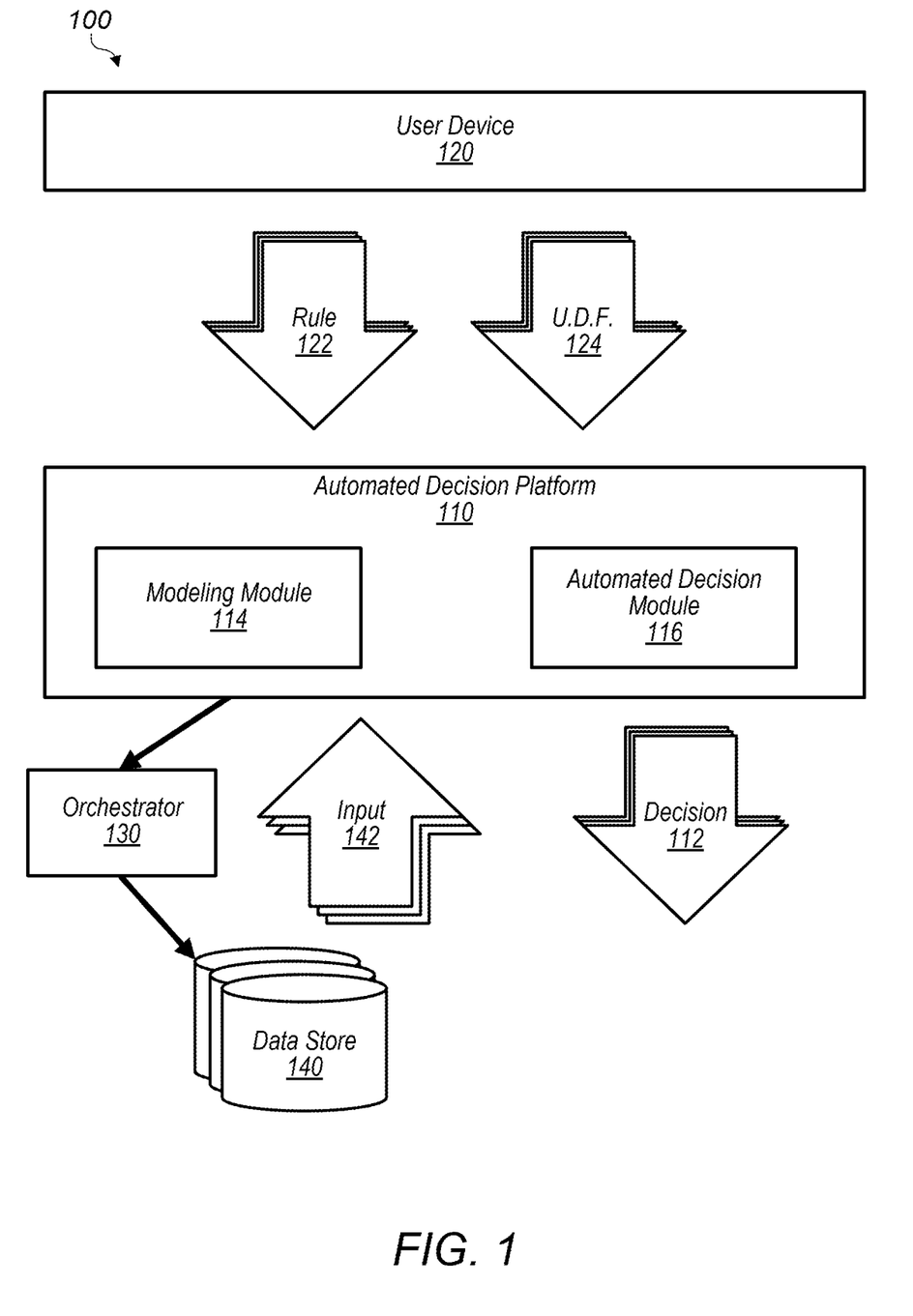
FIG. 1 is a block diagram illustrating an automated decision computer system in accordance with various embodiments.

Referring now to FIG. 1, a block diagram illustrating an automated decision computer system 100 in accordance with various embodiments is shown. In various embodiments, automated decision computer system 100 includes one or more automated decision platforms 110, one or more user devices 120, one or more orchestrators 130, and one or more data stores 140. As discussed herein, in various embodiments automated decision platform 110 receives rules 122 and/or user-defined functions (UDFs) 124 and one or more sets of inputs 142 to determine one or more decisions 112. As discussed herein, the various components of automated decision computer system 100 may be implemented on one or more computer systems (e.g. standalone system, networked system of one or more computing devices, or other configurations). In some of such embodiments, user device 120 is implemented with a first computer system and automated decision platform 110, orchestrator 130, and data store 140 are implemented with a second computer system (e.g., a multi-tenant computer system 400 shown in FIG. 4 implemented on a cloud of computer servers).

In various embodiments, automated decision platform 110 is operable to automate a decision flow to determine one or more decisions 112 using one or more user-defined rules 122 and/or UDFs 124 and based on one or more sets of inputs 142. In various embodiments, automated decision platform 110 includes one or more modeling modules 114 and one or more automated decision modules 116. In various embodiments, modeling module 114 is operable to generate a graph model (e.g., graph model 204 in FIG. 2) from the rules 122 and/or UDFs 124 and to determine, from the graph model, an input dependency model (e.g., input dependency model 206 in FIG. 2) that is indicative of a set of inputs 142 referred to in the graph model. In various embodiments, the input dependency model is useable by orchestrator 130 to coordinate accesses to one or more data stores 140 in which the set of inputs 142 are stored. In various embodiments, automated decision module 116 is operable to receive, from data stores 140, set of inputs 142. Subsequently, automated decision module 116 is operable to apply inputs 142 to the graph model to determine one or more automated decisions 112. Automated decision platform 110 is discussed in further detail herein in reference to FIGS. 2, 3, 4, and 6. Implementations of the automated decision platform 110 in accordance with various embodiments are discussed in further detail herein in reference to FIGS. 2, 3, and 4.

In various embodiments, user device 120 is any of a number of computer systems that a user can access to input rules 122 and/or UDFs 124. User devices 120 include but are not limited to desktop computers, laptop computers, tablet computers, and mobile phones in various embodiments. In some embodiments, user device 120 is a terminal used to access a local computer system (e.g., a server or a mainframe computer system) or remote computer system (e.g., a cloud computer system) via a remote access protocol (e.g., a remote desktop, a virtual machine). In various embodiments, user device 120 communicates with automated decision platform over a local area network, a wide area network (e.g., the Internet), or a combination of both.

In various instances, a user inputs one or more rules 122, UDFs 124, or a combination of both on user device 120. Rules 122 define actions (e.g., calculations to perform, selections to be made, variables to set, a subsequent rule 122 or UDF 124 to apply, etc.) to be performed when one or more conditions are met (e.g., X=TRUE if Y>5, X=FALSE if Y<5). Rules can be far more complex than these simple examples, however, and in some cases may involve dozens or even hundreds of variables that are used in evaluating the rule. Results of the evaluation of a rule may be binary (e.g. yes/no) in some cases but may also produce one of a set of defined multiple outcomes (e.g. exclusively one of A, B, C, or D) and/or may produce a numeric value which may be within a particular bounded range (e.g. 0.00 to 100.00). Evaluation of a rule may in some cases also produce multiple types of outputs (e.g. risk score 96.72, deny transaction).

In some instances, a particular rule 122 takes as input (a) information stored in data store 140 (e.g., input 142) and/or (b) information output by another rule 122 and/or UDF 124. UDFs 124 define one or more actions to perform in association with one or more rules 122 (e.g., writing to a log file, applying a machine-learning algorithm to an input and/or output of a rule 122, converting a datatype of a variable from one datatype to a different datatype). Accordingly, in some instances, a particular UDF 124 take as input (a) information stored in data store 140 (e.g., input 142, which may represent multiple values) and/or (b) information output by a rule 122 and/or another UDF 124. Collectively, rules 122 (and in various embodiments rules 122 and UDFs 124) define an automated decision flow that takes input 142 and determines one or more decisions 112 by applying the input 142 to the decision flow. Rules 122, UDFs 124, and decisions 112 are discussed in more detail in reference to FIGS. 2, 3, 5, and 6.

Orchestrator 130 controls accesses to data stores 140 to improve the efficiency of such accesses compared to random accesses. In various embodiments, orchestrator 130 is implemented by software running on a computer system (e.g., a desktop computer, a laptop computer, a tablet computer, a mobile phone, a server) or a plurality of computer systems (e.g., a network of servers implementing a cloud computing platform). In other embodiments, orchestrator 130 is implemented in specialized hardware (e.g., on an FPGA) or in a combination of hardware and software. In various instances, orchestrator 130 is operable to determine one or more of: an order in which to perform the accesses, which of the accesses can be performed in parallel (and which must be performed in serial), or how long the accesses will take to perform and is operable to cache accessed information to speed up repeated queries. As discussed in further detail in reference to FIG. 2, in various embodiments, orchestrator 130 is operable to make such determinations using an input dependency model (e.g., input dependency model 206 in FIG. 2). In various instances, orchestrator 130 is thus operable to increase the efficiency of access to data stores 140.

In various embodiments, the one or more data stores 140 are configured to store information for subsequent retrieval. As discussed herein, various rules 122 and/or UDFs 124 call for information stored in the data stores 140 in various instances. For example, a rule 122 might refer to a record of previous transactions as input and output a decision based on the record of previous transactions (e.g., a fraud score, a recommendation for a product or service, a classification for a subsequent transaction). Data stores 140 may also include a variety of other information, including information specific to a user computing device (e.g. hardware/software configuration information like operating system version, web browser version, screen size, etc.), network information such as IP address etc., transaction information such as destination shipping address, and user account information such as country of citizenship, home address, etc. In various embodiments, the information stored in data stores 140 that is referred to by one or more rules 122 and/or UDFs 124 is accessed according to the control of orchestrator 130, and is sent to automated decision platform 110 as part of the set of inputs 142.

As discussed herein, automated decision platform 110 is useable to improve some or all of the deficiencies in prior automated decision flows identified above. As discussed in further detail in reference to FIGS. 2 and 5, in various embodiments because rules 122 and many UDFs 124 (although more complex UDFs 124 may need to be complied as discussed herein) can be managed released as configurations represented with structured text (e.g., XML, JSON, YAML), such rules 122 and UDFs 124 can be used by automated decision platform 110 without having to compile the rules 122 and/or UDFs 124. As used herein, "compile" includes a process by which a high-level programming language is converted to a lower-level executable and/or interpretable language (e.g. turning Java™ source code into Java™ byte code). Because compilation is not performed on various rules 122 and UDFs 124 in various embodiments, the time needed to change the graph model used to implement the rules 122 and UDFs 124 is reduced, allowing for an ability to add, change, or remove rules 122 and UDFs 124 faster compared to techniques in which rules must be compiled (e.g., an automated decision platform running on rules written in Java™). This ability to use rules without compiling them into a rule engine can be particularly advantageous when dealing with a rule engine that may execute rule sets from multiple sources, as changes can be made to one or more rules without having to re-compile a large set of rules used by the rule engine.

Figure 3:
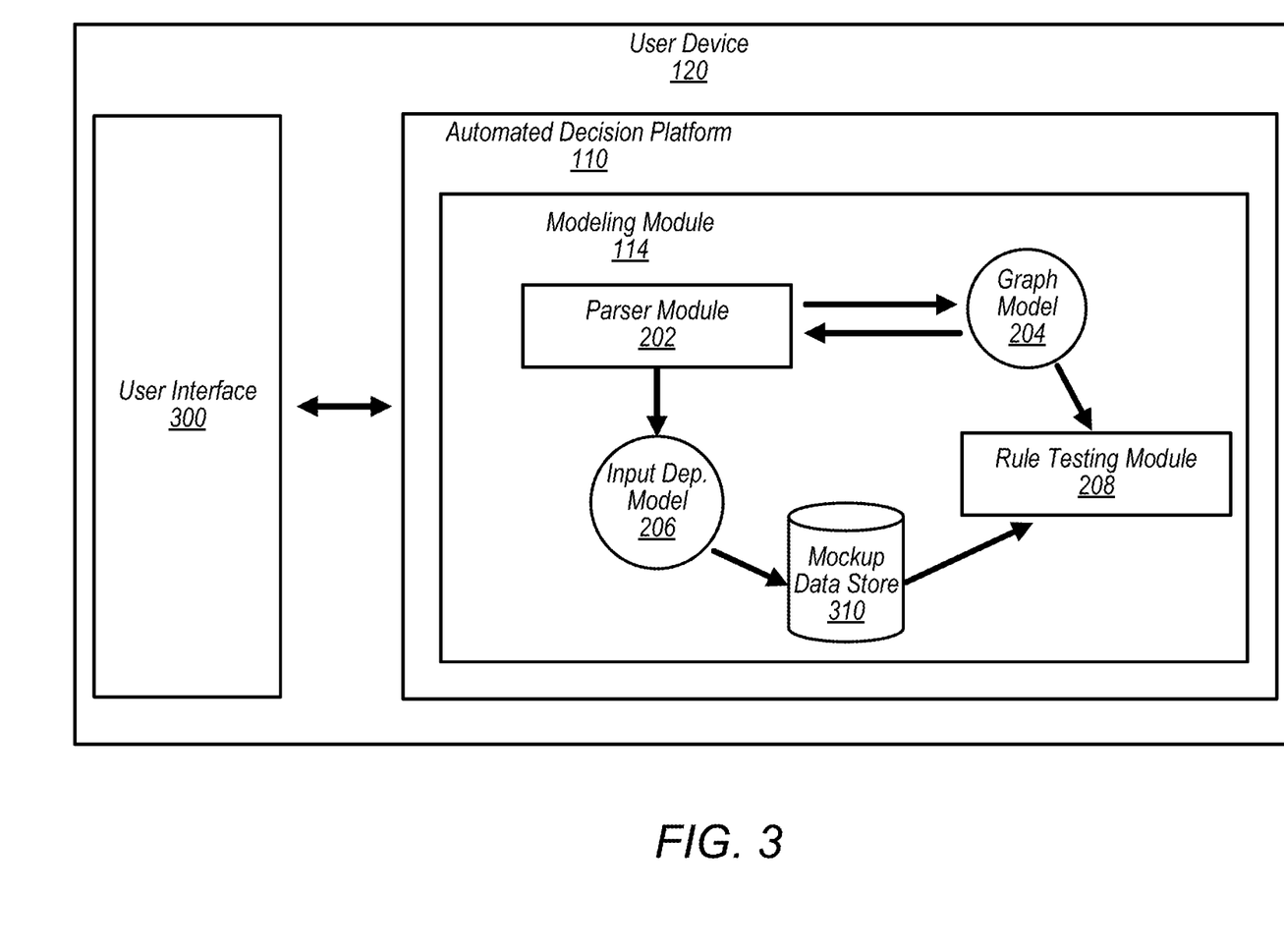
FIG. 3 is an expanded block diagram of the user device of FIG. 1 in accordance with various embodiments.
Figure 4:
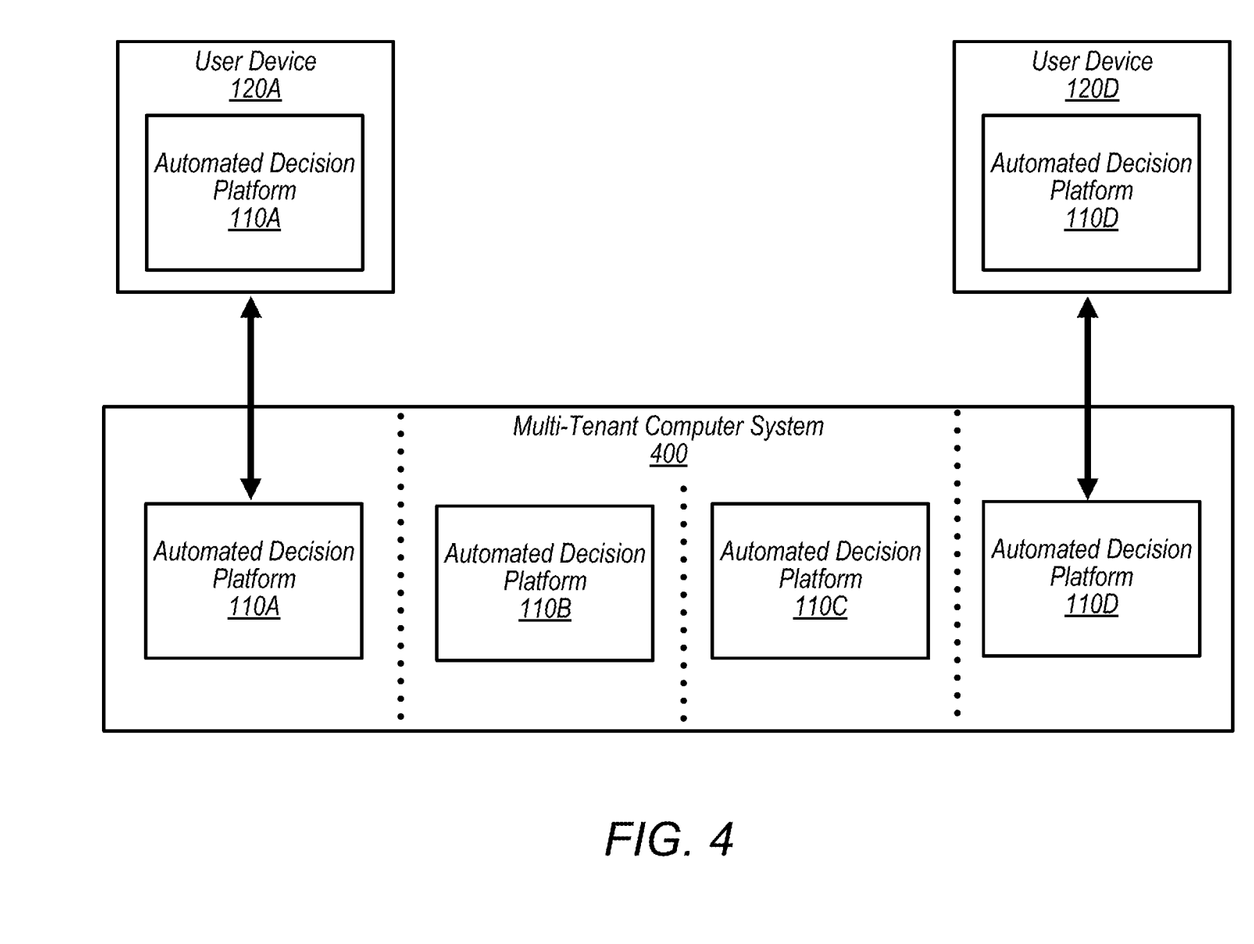
FIG. 4 is a block diagram illustrating an embodiment of the automated decision platform implemented on a multi-tenant computer system and various user devices in accordance with various embodiments.

Additionally, in various embodiments, modeling module 114 is operable generate an input dependency model that is useable by orchestrator 130 to control accesses to data stores 140. Such controlled access allows the data stores 140 to be accessed in a more time and/or computationally efficient way compared to random accesses by, for example, performing accesses in parallel, sequencing accesses to reduce loading times, etc. Moreover, because the automated decision platform 110 itself may be flexibly implemented on various operating systems, multiple instances of automated decision platform 110 may be implemented on a single computer system (e.g., the multi-tenant computer system 400 in FIG. 4) and/or on user devices 120 (e.g., as shown in FIGS. 3 and 4). Accordingly, in addition to allowing for faster changes to the automated decision flow by adding, changing, or removing rules 122 and/or UDFs 124, the automated decision flows that are implemented using automated decision platform 110 may be implemented faster, with fewer computational resources, and with more flexibility compared to previous methods.

Figure 2:
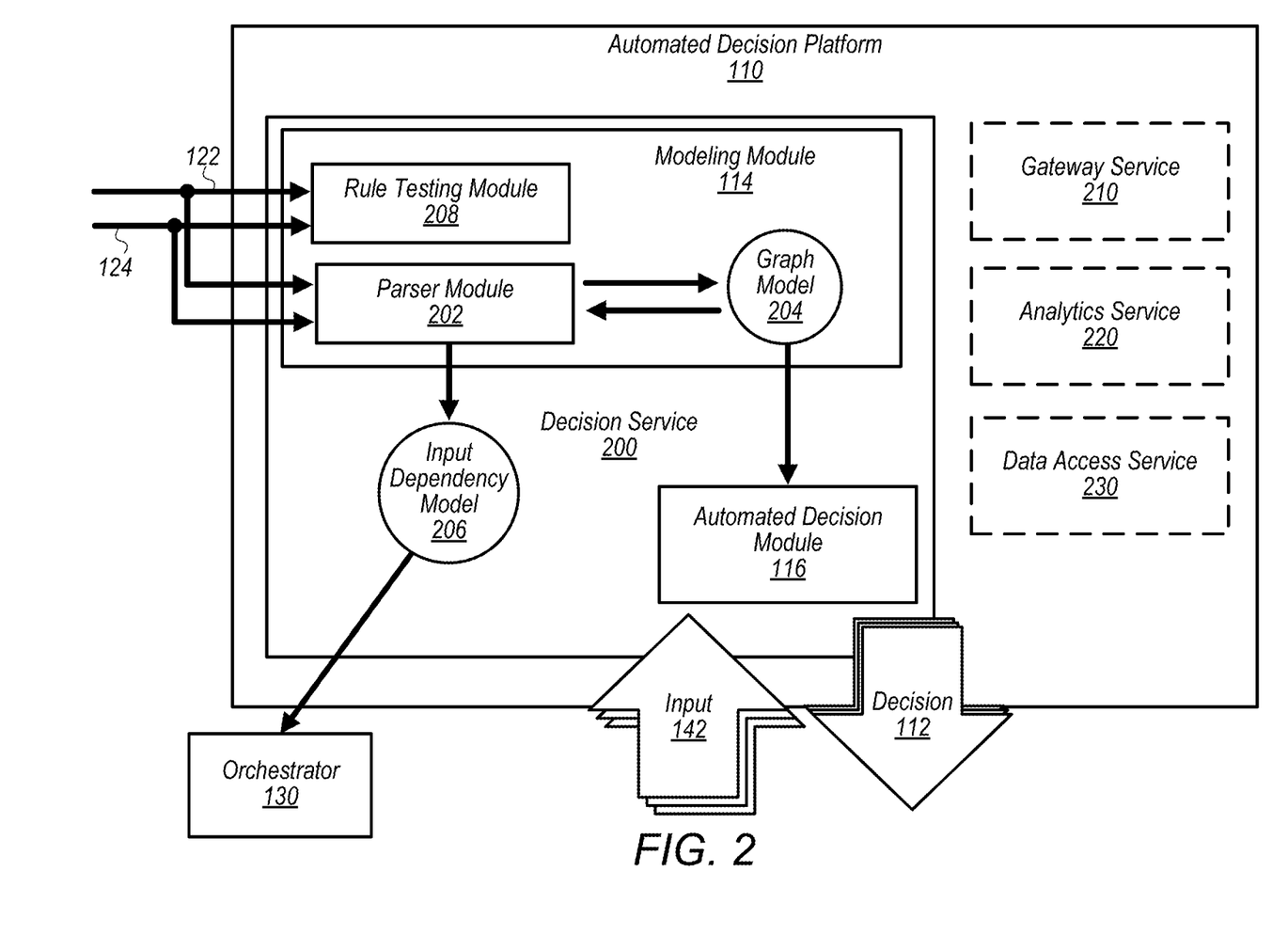
FIG. 2 is an expanded block diagram of the automated decision platform of FIG. 1 in accordance with various embodiments.

Referring now to FIG. 2, an expanded block diagram is shown of automated decision platform 110 in accordance with various embodiments. In various embodiments, automated decision platform 110 is implemented as a number of services including a decision service 200 which implements modeling module 114 and automated decision model 116, a gateway service 210, an analytics service 220, and a data access service 230. In various embodiments, these various services are made available (e.g., through application programming interfaces) to other applications running on the same computer system as automated decision platform 110 and, in embodiments, to applications running on other computer systems (e.g., over a LAN or WAN connection).

Decision service 200 includes modeling module 114 and automated decision module 116. In various embodiments, modeling module 114 includes one or more parser modules 202 and a rule testing module 208. In various embodiments, the one or more parser modules 202 are operable to (a) generate graph model 204 from rules 122 and/or UDFs 124 and (b) analyze graph model 204 to generate input dependency model 206. In various embodiments, separate parser modules 202 are used such that a first parser module 202 is operable to generate the graph model 204 and a second parser module 202 is used to generate input dependency model 206 from graph model 204.

Figure 5:
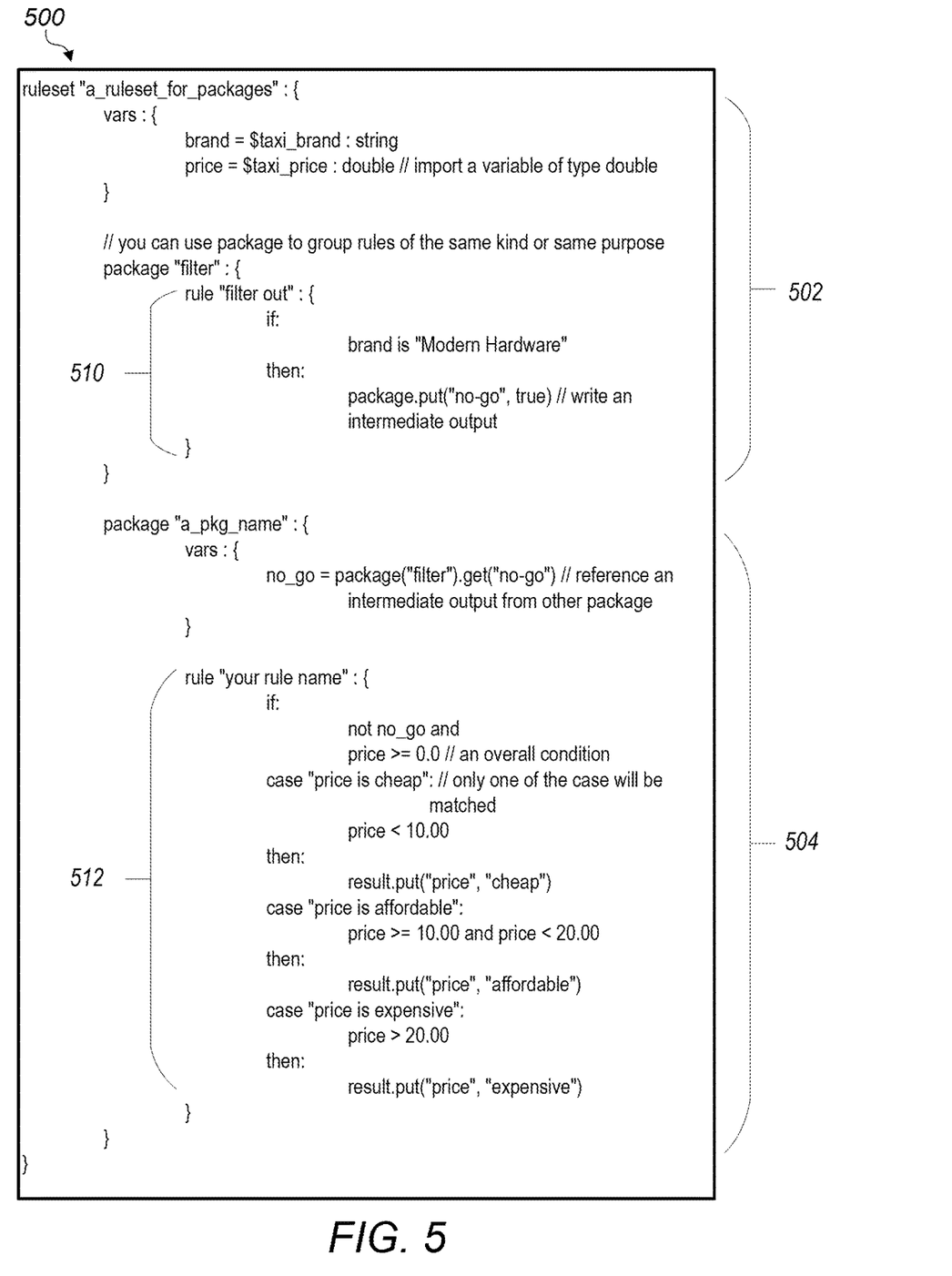
FIG. 5 illustrates pseudocode of an example ruleset in accordance with various embodiments.

As discussed in further detail in reference to FIG. 5, in various embodiments, rules 122 and/or UDFs 124 are stored as structured text that uses syntax such as punctuation and/or spacing to indicate rule packages and individual rules and defined commands and syntax to represent rules in a manner similar to a high-level programming language. Parser module 202 is operable to generate graph model 204 from this structured text by: (a) determining where the various rules 122 and/or UDFs 124 begin and end in the structured text; (b) determining a sequence in which the rules 122 and/or UDFs 124 should be applied, (c) identifying one or more inputs, one or more conditions, and one or more actions defined by the various rules 122, (d) identifying one or more inputs and one or more actions defined by the various UDFs 124, and (e) determining for each given rule 122 and/or UDF 124 the other rules 122 and/or UDFs 124 that supply input or receive output from that given rule 122 and/or UDF 124. In various embodiments, parser module 202 (or a second parser module 202) is operable to analyze graph model 204 (or determine directly from rules 122 and/or UDFs 124) what input 142 is referred to by the graph model 204 and might be used to determine decisions 112. In such embodiments, parser module 202 generates input dependency model 206.

In various embodiments, graph model 204 is any of a number of graph models in which rules 122 and UDFs 124 are represented as nodes and connections between rules 122 and UDFs 124 are represented as edges. For example, if a rule 122 calls a UDF 124, then this network may be represented by a first node representing rule 122, a second node representing UDF 124, and an edge between the two nodes representing the information flow between the rule 122 and UDF 124. In a second example, if a UDF 124 converts the datatype of information stored in a data store 140 and then outputs the information in a converted datatype to a rule 122, this network may be represented with a third node representing the UDF 124, a fourth node representing rule 122, and an edge between the two nodes representing the information flow between the UDF 124 and rule 122. In various embodiments, the graph model 204 generated by parser module 202 is a directed acyclic graph model.

In various embodiments, parser module 202 generates input dependency model 206 based on graph model 204. Alternatively or additionally, parser module 202 generates input dependency model 206 based on the rules 122 and/or UDFs 124 used to generate graph model 204. In various embodiments, input dependency model 206 indicates, for individual inputs 142 of the set of inputs 142: a name of the individual input, a namespace of the individual input, a location of the individual input, and a datatype of the individual input. In various embodiments, some more complex UDFs 124 (e.g., machine learning model inferencing, existing machine learning feature processing algorithms, interacting with existing APIs) can be written in a general-purpose programming language (e.g., Java™) that needs compilation. In such embodiments, these complex UDFs 124 are compiled and represented in graph model 204 and in input dependency model 206 as a dependency. In such embodiments, during execution of such complex UDFs 124 a language interoperability function is loaded from data store 140 and used to run the complex UDFs 124.

Using the information contained in input dependency model 206, orchestrator 130 is able to determine which accesses can be performed in parallel, which accesses will take longer than other accesses (e.g., so a longer access can be performed in parallel with two shorter accesses performed in in series such that all three accesses are complete by the time the longer access is complete), in which order the accesses should be completed to account for differences in the amount of time for the access and/or the location of the information stored within data store 140 (e.g., to group accesses that are located on the same physical media and thereby reduce total access time for the group of accesses), and which separate accesses can be combined (e.g., if access A is loading the last 10 transactions of user1 from transactionHistoryDb and access B is loading the last 20 transactions of user1 from transactionHistoryDb, the orchestrator is able to decide that making only one physical access to db1 (load last 20 transactions) is able to fulfill both requirements). In various embodiments, orchestrator 130 is operable to cache information for faster repeated accesses compared to accessing the information from data store 140.

In various embodiments, modeling module 114 includes rule testing module 208. In such embodiments, rule testing module 208 is operable to validate rules 122 and/or UDFs 124. In various instances, validating the rules 122 and/or UDFs 124 includes determining whether the rules 122 and/or UDFs 124 are written in the correct format, are written using the correct syntax and punctuation, and written without improperly using reserved terms. In various instances, validating the rules 122 and/or UDFs 124 includes validating dependencies referred to by the rules 122 and/or UDFs 124. In such instances, validating dependences includes determining whether such dependencies (e.g., information referred to by a rule 122 and/or UDF 124) can be located (e.g., have a correct namespace and/or location), have a correctly listed datatype, are available for use according to the access privileges of user or user device 120.

In various embodiments, automated decision module 116 is operable to receive input 142, apply input 142 to graph model 204, and determine decisions 112. In various embodiments, a plurality of nodes of graph model 204 take as input one or more respective ones of the set of inputs 142. In such embodiments, applying the set of inputs 142 to graph model 204 includes inputting the respective ones of the set of inputs 142 to the corresponding nodes. As discussed herein in additional detail in reference to FIG. 5, decisions 112 include one or more actions to be performed as result of applying input 142 to one or more rules 122. In a first example, one or more decisions 112 include a prediction of whether a particular transaction request is fraudulent (e.g., an action to set a prediction score to a certain amount, another action to compare the prediction score to a fraud predictions threshold score). In a second example, one or more decisions 112 include determining a recommendation for a product or service (e.g., an action to recommend product A versus product B if a condition is met). In various embodiments, decisions 112 are output by automated decision platform 110 by, for example by returning the decisions 112 to another computer implemented service that called automated decision platform 110 via an API, displaying decisions 112 on a user interface to a user, etc.

As discussed herein, in various instances, automated decision platform 110 is implemented with services other than decision service 200. In various embodiments, gateway service 210 is operable to provide multi-tenant access to the various services of automated decision platform 110. As discussed in further detail in reference to FIG. 4, in various embodiments, a multi-tenant computer system may implement a plurality of automated decision platforms 110 as tenants that share the computer resources of the multi-tenant computer system (e.g., to run multiple automated decision platforms 110 running different sets of rules 122 and/or UDFs 124). In such embodiments, automated decision platforms 110 may include various services to facilitate implementation as a tenant, generate analytics indicative of performance within a multi-tenant computer system, etc. In various embodiments, analytics service 220 is operable to provide, in various embodiments, real-time, near-real-time, or batch-based analytics to enable users to evaluate the efficacy of rules 122 and/or UDFs 124 to determine whether rules 122 and/or UDFs 124 should be added, removed, or modified. In various embodiments, data access service 230 is operable to facilitate data acquisition, monitoring, processing, access, and governance (e.g., for data stared in data stores 140 for example).

Referring now to FIG. 3, an expanded block diagram of user device 120 in accordance with various embodiments is shown. In various embodiments, user device 120 includes a user interface 300 and an instance of automated decision platform 110. In embodiments, an instance of automated decision platform 110 can be implemented as a script running within a web browser or other application (not shown) on user device 120. In other embodiments, automated decision platform 110 is implemented as an application installed on user device 120.

In various embodiments, user interface 300 is operable to present information to a user and receives information from the user to enable the user to create rules 122 and/or UDFs 124. In various embodiments, user interface 300 interfaces with automated decision platform 110 to receive user-defined rules 122 and/or UDFs 124 and to present information to the user to enable the user to add, change, or remove rules 122 and/or UDFs 124. In various embodiments, user interface 300 includes a text box operable to receive text entered by a user (e.g., via a keyboard coupled to user device 120) and to display the entered text. As discussed herein, in various embodiments rules 122 and/or UDFs 124 include structured text. In various embodiments, user interface 300 is operable to enable a user to enter such structured text directly. In various embodiments, user interface 300 includes a graphical user interface that includes, for example, icons, menu choices, etc. representing available input sources, pre-programmed conditions and actions, and links between rules 122 and/or UDFs 124 such that a user can select from among these icons to add, change, or remove rules 122 and/or UDFs 124. In such embodiments, user interface 300 is operable to automatically generate the structured text based on the selections made by the user such that a user is able to add, change, or remove rules 122 and/or UDFs 124 without needing a technical understanding of the structured text and its conventions, syntax, punctuation, etc.

In various embodiments, the instance of automated decision platform 110 running on user device 120 (and/or elsewhere) includes a modeling module 114 as discussed herein. Modeling module 114 includes a mockup data store 310 that is useable by rule testing module 208 to verify the dependencies of rules 122 and/or UDFs 124 added or changed by the user. In various embodiments, mockup data store 310 includes information that is a sample of or is representative of the information stored in data stores 140 that is useable by rule resting module 208 to verify dependencies. In some embodiments, mockup data store 310 includes a historical data store of production data that has previously been evaluated using prior rules 122 and/or UDFs, which allows for evaluation of new or changed rules 122 and/or UDFs 124 in view of the performance under the prior rules 122 and/or UDFs. Such dependencies may be verified, for example, by determining that the various rules 122 and/or UDFs 124 properly invoke information stored in mockup data store 310 (e.g., by calling the correct namespace and/or location, by identifying the correct datatype, etc.). In various instances, mockup data store 310 also stores information that is useable by rule testing module 208 to simulate the performance of a set of rules 122 and/or UDFs 124 (e.g., to evaluate a simulated catch rate or false positive rate of a fraud detection ruleset, to evaluate the projected customer response to an advertising campaign that recommends products to customers according to a product recommendation ruleset).

Because an instance of automated decision platform 110 and a mockup data store 310 can be implemented by a user device 120, a user is able to input and verify rules 122 and/or UDFs 124 without having to connect to an automated decision platform 110 operating on another computer system (e.g., an automated decision platform 110 running in a cloud computing environment). Thus, a user is able to input and verify proposed rules 122 and/or UDFs 124 at the user's leisure and to test changes before pushing new or changed rulesets to an automated decision platform 110 running in a production computing environment, for example, while still using the same (or similar) data stores and process flows as the production environment. Moreover, user interface 300 is able to receive input from users who lack the skills to program in a structured text format, thus enabling rules to be added, changed, or removed by users who are not developers. In contrast, in previous automated decision processes, a rule might need to be written in a programming language and then compiled before being pushed to the production computing environment, in which case only a developer with adequate skill might be able to add or change rules.

Referring now to FIG. 4, a block diagram illustrating various embodiments of a plurality of automated decision platforms 110 implemented on a multi-tenant computer system 400 and various user devices 120 is shown. In various embodiments, automated decision platform 110 is flexible and portable such that an instance of automated decision platform 110 can be run on various operating systems (e.g., on a first operating system run by multi-tenant computer system 400, on a second operating system run by user device 120A, on a third operating system run by user device 120D). In the embodiment shown in FIG. 4, four separate instances of automated decision platform 110A, 110B, 110C, 110D and three data stores 140B, 140C and 140D are implemented by multi-tenant computer system 400, a first user device 120A implements an instance of automated decision platform 110A, and a second user device 120D implements an instance of automated decision platform 110D. As shown in FIG. 4, logical separations between tenants are represented by dotted lines and various automated decision platforms 110 are in communication one of three data stores 140A, 140B, 140C. It will be understood, however, that multi-tenant computer system 400 may implement any number of instances of automated decision platform 110 and may be in communication with any number of user devices 120 that may (or may not) implement separate instances of automated decision platform 110 and various data stores 140 in various embodiments.

In various embodiments, multi-tenant computer system 400 implements a plurality of instances of automated decision platform 110, each of which implements an automated decision flow as discussed herein. In various embodiments, some instances of automated decision platform 110 implement the same decision flow (e.g., for load sharing, for redundancy), but in other instances each implements a different decision flow based on different sets of rules 122 and/or UDFs 124. In various embodiments, some instances of automated decision platform 110 (e.g., 110A and 110B) share access to one or more data store 140 (e.g., 140B) whereas other instances of automated decision platform 110 (e.g., 110C and 110D) do not share access to data stores (e.g., 140C and 140D). In various embodiments, some instances of automated decision platform 110 may be in production computing environments (e.g., the instance of automated decision platform 110 is being used to automate decisions for customers) while others are pre-production computing environments (e.g., an instance of automated decision platform 110 that is used for testing new or modified rules 122 and/or UDFs 124 prior to release to the production computing environment).

For example, an instance of pre-production automated decision platform 110A implemented within multi-tenant computer system 400 is shown as being in communication with another instance of automated decision platform 110A implemented on user device 120A. Automated decision platform 110A is implemented in a production computing environment, and is operable to receive information from automated decision platform 110A. The instance of automated decision platform 110A implemented within multi-tenant computer system 400 is operable to verify, using data store 140B, a second set of rules 122 and/or UDFs 124 received from user device 120A, and release the second set of rules 122 and/or UDFs 124 to automated decision platform 110B. In some of such embodiments, automated decision platform 110B is running an automated decision flow generated from a first set of rules 122 and/or UDFs 124 that were previously verified and released to the production computing environment. In various embodiments, such release is performed by sending the rules 122 and/or UDFs 124 themselves, but in other embodiments such release is performed by sending the graph model and/or input dependency model generated from the rules 122 and/or UDFs 124 to automated decision platform 110B. In various embodiments, neither the first set of rules 122 and/or UDFs 124 or the second set of rules 122 and/or UDFs 124 are compiled as discussed herein. In various embodiments, releasing the second set of the rules 122 and/or UDFs 124 includes replacing the first set of rules 122 and/or UDFs 124 in the production computing environment, but in other embodiments the second set of rules 122 and/or UDFs 124 is used to supplement or modify the first set of rules 122 and/or UDFs 124. Alternatively or additionally, in some embodiments, some or all of the new or changed rules 122 and/or UDFs 124 are verified by the user device 120 (e.g., user device 120A, 120D) on which the rules 122 and/UDFs 124 were inputted.

Accordingly, a multi-tenant computer system 400 is operable to implement multiple automated decision platforms 110 (some or all of which might implement different automated decision flows) for various reasons and to enable changes to be made to the sets of rules 122 and/or UDFs 124 defining the automated decision flows. For example, a multi-tenant computer system 400 might implement various instances of automated decision platforms for various regions to implement sets of rules 122 and/or UDFs 124 that account for regional differences (e.g., a first automated decision platform 110 for fraud detection in the U.S, a second automated decision platform 110 for fraud detection in Europe, etc.), testing of different sets of rules 122 and/or UDFs 124 (e.g., a first automated decision platform 110 running a first set of rules 122 and/or UDFs 124 and a second automated decision platform 110 running a modified set of rules 122 and/or UDFs 124 that are evaluated to see which performed better), or other reasons.

Referring now to FIG. 5, pseudocode of an example ruleset 500 in accordance with various embodiments is shown. As used herein, a "ruleset" refers to a set of rules 122 and/or UDFs 124 discussed herein. In various embodiments, a "ruleset" includes only rules 122 or only UDFs 124, but in other embodiments a "ruleset" can include both rules 122 and UDFs 124. The example in FIG. 5 is non-limiting, and it will be understood that the techniques discussed herein can be applied to various rulesets to accomplish any of a number of classification, fraud prediction, recommendation, or other tasks based on analysis of information stored in various data stores 140.

As discussed herein, the rules 122 and/or UDFs 124 are stored as structured text. In various embodiments, such structured text is written in a domain-specific language (DSL) that is specific to the context of the automated decision platform(s) 110 discussed herein. In various instances, because the rules 122 and/or UDFs 124 are written in a DSL that is specific to automated decision platform 110, these rules 122 and/or some UDFs 124 do not need to be compiled to be implemented by automated decision platform 110 in a decision flow as discussed herein. As discussed herein, in various embodiments, some more complex UDFs 124 (e.g., machine learning model inferencing, existing machine learning feature processing algorithms, interacting with existing APIs) can be written in a general-purpose programming language (e.g., Java™) that needs compilation.

In various embodiments, the DSL for automated decision platform 110 provides for various features relating to creation, validation, and execution of rules 122 and/or UDFs 124. In various embodiments, the DSL language (a) is statically typed—in compile time, automated decision platform 110 can determine from the DSL which field or method of access is allowed or not allowed for certain data type being used; (b) provides for type inference—in compile time, automated decision platform 110 can automatically identify the data type of some variables, (c) provides null safety—in runtime, the DSL ensures that the field. method access, or operation of a Null value is safe and no NPE should be thrown, (d) provides interoperability with Java™ to support Java function calls (e.g., calls to UDFs 124 written in Java), (e) provide dependency inference—automated decision platform 110 can automatically parse the dependencies of a ruleset 500, telling what are the inputs and outputs to support dependency validation and generation of the input dependency model 206. In various embodiments, the DSL for automated decision platform 110 provides developers with various features to facilitate the writing and evaluating of rules 122 and/or UDFs 214 including but not limited to (a) a debug mode in which all expressions' values (even nested expressions) are printed to logs, (b) an audit model in which the various rules 122 can be validated to see if the various rules' 122 conditions can be satisfied, (c) a strict mode in which verification of the rules 122 and/or UDFs 124 can be interrupted (or not) if an error is encountered, and (d) a web portal to support rule authoring for the DSL such that developers do not need to know the DSL and can user drag and drop widget which the web portal can translate into DSL. In various embodiments, the DSL for automated decision platform 110 provides features for (a) simulation of the execution of a ruleset 500 and (b) monitoring by capturing the rule evaluation result for a ruleset 500 using one or more historical datasets to which one or more previous rulesets 500 have been applied (e.g., the performance of a new or changed ruleset 500 can be evaluated against prior performance using the performance of the one or more previous rulesets 500 as benchmarks)

In various embodiments, a ruleset 500 includes one or more variable declaration sections 502, one or more rule packages 504, and a plurality of individual rules such as first rule 510 and second rule 520. In various embodiments, rules 122 and/or UDFs 124 defined in ruleset 500 are hierarchical such that the one or more rule packages 504 are at a first level of the hierarchy and each of the one or more rule packages 504 includes one or more individual rules (e.g., rules 510, 520) at a second level of the hierarchy. In various embodiments, there is no dependency between individual rules in the same rule package. In such embodiments, because there is no dependency between rules 122 in the same rule package 504, each rule 122 can be executed in parallel. Moreover, when a user is adding a rule package 504 or changing an existing rule package 504, during validation of the rule package 504 the user has assurance that each individual rule 122 will be triggered when the rule package 504 is triggered in various embodiments.

As shown in FIG. 5, a hierarchical ruleset 500 can access information, evaluate accessed information according to conditions and perform actions based on the evaluation, store intermediate information for use by other rules within ruleset 500, and store one or more decisions 112. In various embodiments, the one or more variable declaration sections 502 are used to define variables that are used in ruleset 500 (e.g., "brand=$taxi_brand:string"). In various embodiments, a definition for a particular variable includes a name of the variable (e.g., "brand"), a namespace or location of information to be accessed from a data store 140 to be used in the variable (e.g., "$taxi_brand"), and a datatype (e.g., "string"). The various rule packages 504 in the ruleset 500 may include rules of the same kind (e.g., rules relating to evaluating dollar amounts of transactions) or purpose (e.g., rules used in a fraud detection algorithm). In various embodiments, rules in a rule package 504 can pass information to each other via intermediate outputs (line 512) that are subsequently accessed (line 522). As shown in FIG. 5, both rules 510 and 520 include one or more if/then statements. Further, as shown in FIG. 5, rule 520 includes various case statements. The final output of ruleset 500 is determined by rule 520 in the put command to a location named "result" (e.g., line 524). For example, if the stored information indicates that the brand is "Modern Hardware" with a price of 15, then the decision 112 is "price" and "cheap" in line 524.

In addition to the example shown in FIG. 5, the following pseudocode provides additional examples of rules 122 written in DSL.

The following pseudocode is an example of commands that may be used to debug a rule 122:

```
ruleset "a_simple_ruleset" : {
    vars : {
        inputA = $inputA
        inputB = $inputB
        inputC = $inputC
        inputD = $inputD
    }
    package "a_pkg_name" : {
        metadata : {
            "debug" : true // turn on debug mode
        }
        rule "your rule name" : {
            if:
                allOf(inputA, anyOf(inputB, inputC) and inputD)) // a nested condition, by using debug mode, you can tell which expression is evaluated to be false
            then:
                result.put("success", true)
        }
    }
}
```

The following pseudocode is an example of commands that may be used to audit a rule 122:

```
ruleset "a_simple_ruleset" : {
    vars : {
        inputA = $inputA
        inputB = $inputB
        inputC = $inputC
        inputD = $inputD
    }
    package "a_pkg_name" : {
        metadata : {
            "audit" : true // turn on audit mode, the rule's condition will be evaluated, but its action won't be fired
        }
        rule "your rule name" : {
            if:
                allOf(inputA, anyOf(inputB, inputC) and inputD)) // a nested condition
            then:
                result.put("success", true) // won't be fired even if the condition is true, because it's in audit mode
        }
    }
}
```

The following pseudocode is an example of commands that may be used to rank a list with a rule 122:

```
ruleset "a_simple_ruleset" : {
    package "a_pkg_name" : {
        rule "ranking rules" : {
            rankable = [{"key":2, "value":2}, {"key":1, "value":1}, {"key":1, "value":999}] // a key-value list as input
            // condition can be ignored, so this rule is always fired
            top = rankable
                .where(item -> item.key > 0) // you can do some filtering first
                .sort(item -> [ item.key, desc(item.value) ]) // you can sort the list by multiple fields, ascending (default) or descending
                .0 // pick the first one
            result.put("rank_top", top)
        }
    }
}
```

The following pseudocode is an example of commands that may be used to output a list of results generated by a rule 122:

```
ruleset "a_simple_ruleset" : {
    package "a_pkg_name" : {
        rule "ranking rules" : {
            rankable = [{"key":2, "value":2}, {"key":1, "value":1}, {"key":1, "value":999}]
            // condition can be ignored, so this rule is always fired
            rankable
                .sort(item -> [ item.key, desc(item.value) ]) // sort the items
                .foreach(item -> result.append("sorted", item)) // use 'append' to append the item into a list of results
        }
    }
}
```

Figure 6:
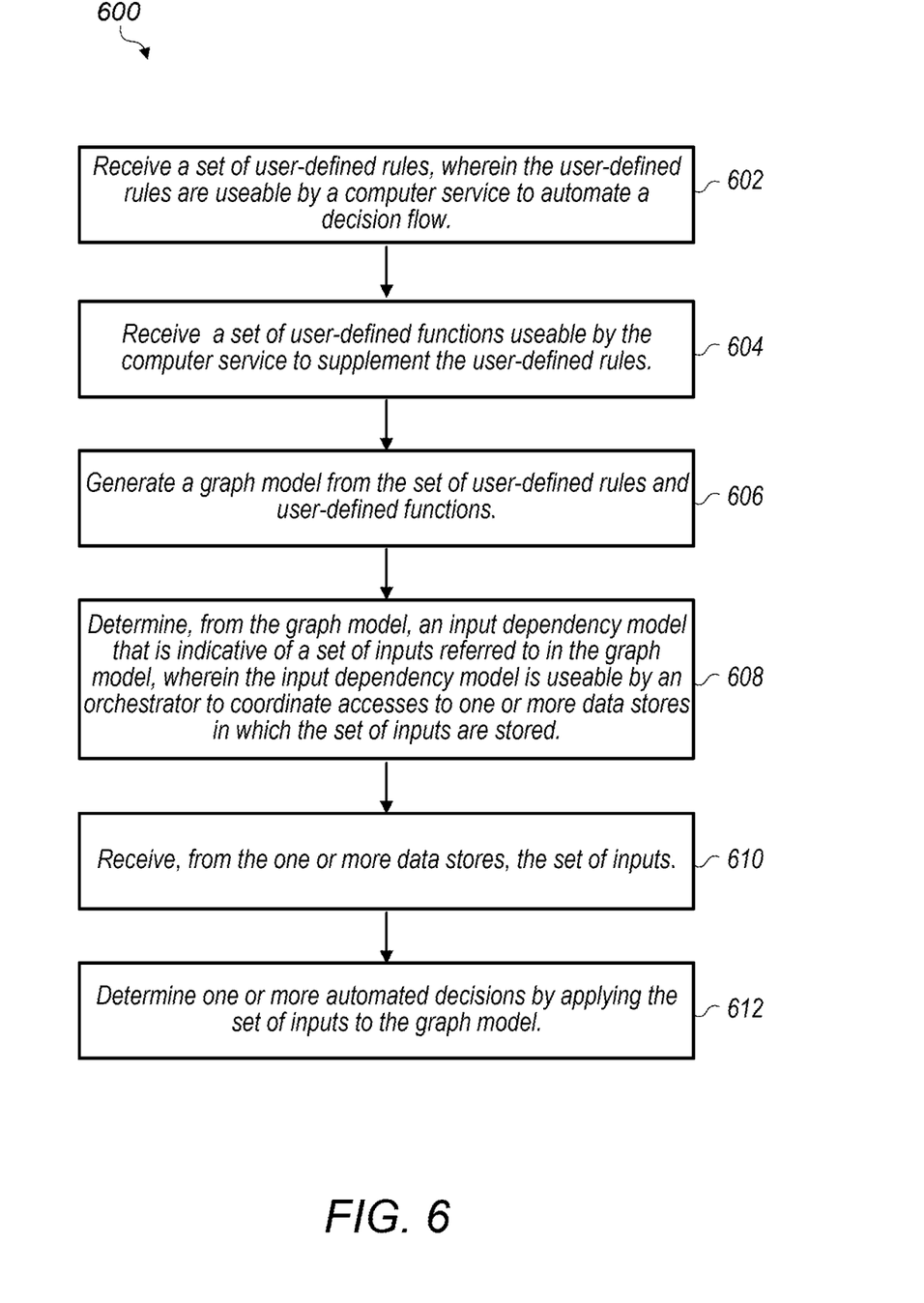
FIG. 6 is flowchart illustrating an embodiment of an automated decision method in accordance with the disclosed embodiments.

Referring now to FIG. 6, a flowchart depicting an automated decision method 600 is depicted. In the embodiment shown in FIG. 6, the various actions associated with method 600 are implemented by automated decision platform 110. In various embodiments, various actions may be added or removed from method 600. For example, a graph model may be generated from rules 122 only with no UDFs 124 as discussed herein.

At block 602, a computer system implementing an automated decision platform 110 (e.g., multi-tenant computer system 400) receives a set of user-defined rules 122. As discussed herein, these rules 122 are useable by a computer service (e.g., a service of automated decision platform 110) to automate a decision flow. At block 604, the computer system implementing an automated decision platform 110 receives a set of UDFs 124 useable by the computer service to supplement the user-defined rules 122. At block 606, the computer system implementing an automated decision platform 110 generates a graph model 204 from the set of user-defined rules 122 and UDFs 124. At block 608, the computer system implementing an automated decision platform 110 determines, from the graph model 204, an input dependency model 206 that is indicative of a set of inputs 142 referred to in the graph model 204. The input dependency model 206 is useable by an orchestrator 130 to coordinate accesses to one or more data stores 140 in which the set of inputs 142 are stored. At block 610, the computer system implementing an automated decision platform 110 receives, from the one or more data stores 140, the set of inputs 142. At block 612, the computer system implementing an automated decision platform 110 determines one or more automated decisions 112 by applying the set of inputs 142 to the graph model 204.

Exemplary Computer System

Figure 7:
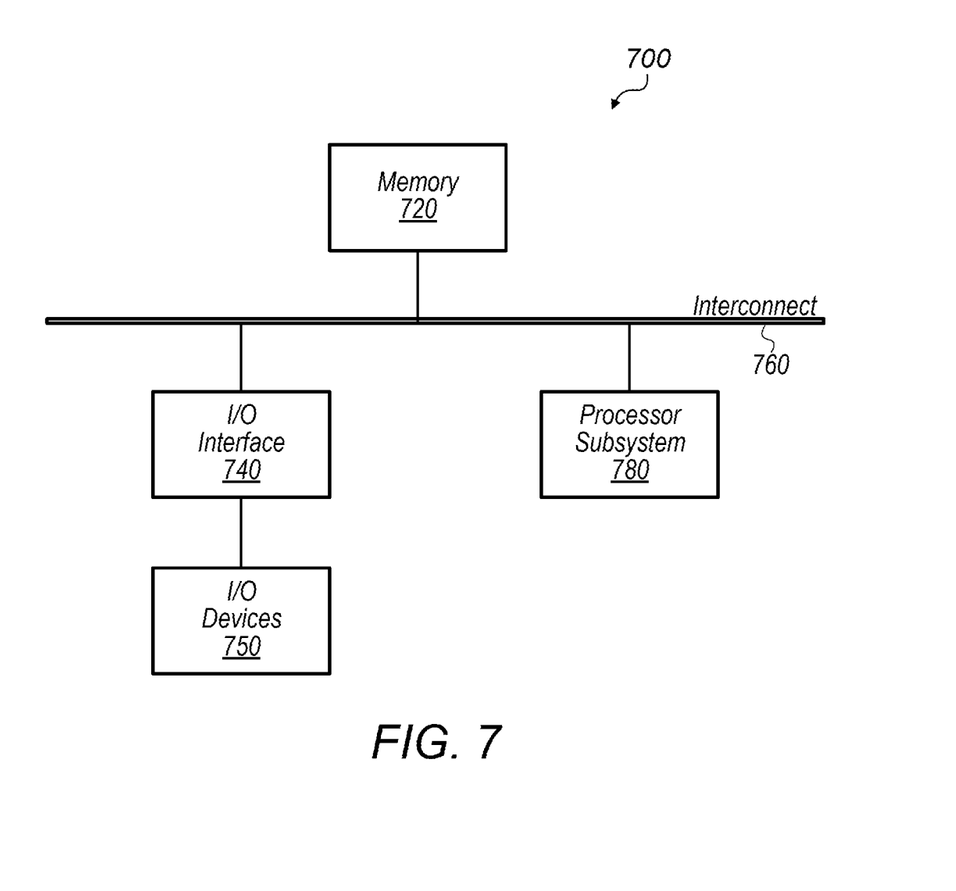
FIG. 7 is a block diagram of an exemplary computer system, which may implement the various components of FIGS. 1, 2, 3, and 4.

Turning now to FIG. 7, a block diagram of an exemplary computer system 700, which may implement the various components of computer system 100 (e.g., a computer system implementing automated decision platform 110, user device 120) is depicted. Computer system 700 includes a processor subsystem 780 that is coupled to a system memory 720 and I/O interfaces(s) 740 via an interconnect 760 (e.g., a system bus). I/O interface(s) 740 is coupled to one or more I/O devices 750. Computer system 700 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 700 is shown in FIG. 7 for convenience, system 700 may also be implemented as two or more computer systems operating together.

Processor subsystem 780 may include one or more processors or processing units. In various embodiments of computer system 700, multiple instances of processor subsystem 780 may be coupled to interconnect 760. In various embodiments, processor subsystem 780 (or each processor unit within 780) may contain a cache or other form of on-board memory.

System memory 720 is usable to store program instructions executable by processor subsystem 780 to cause system 700 perform various operations described herein. System memory 720 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 700 is not limited to primary storage such as memory 720. Rather, computer system 700 may also include other forms of storage such as cache memory in processor subsystem 780 and secondary storage on I/O Devices 750 (e.g., a hard drive, storage array, etc.). In some embodiments, these other forms of storage may also store program instructions executable by processor subsystem 780.

I/O interfaces 740 may be any of various types of interfaces configured to couple to and communicate with other devices, according to various embodiments. In one embodiment, I/O interface 740 is a bridge chip (e.g., Southbridge) from a front-side to one or more back-side buses. I/O interfaces 740 may be coupled to one or more I/O devices 750 via one or more corresponding buses or other interfaces. Examples of I/O devices 750 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 700 is coupled to a network via a network interface device 750 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A computer-implemented method comprising:
receiving, at a computer system, a set of user-defined rules, wherein the user-defined rules are useable by a computer service to automate a decision flow, wherein the decision flow is associated with determining whether to permit completion of an electronic transaction, and wherein determining whether to permit the completion of the electronic transaction includes determining whether to permit the electronic transaction to be processed by the computer system or to present recommendations to a user of the computer system regarding whether to permit the completion of the electronic transaction; and
generating, with the computer system from the set of user-defined rules, a graph model, wherein the graph model is generated without compiling the set of user-defined rules;
determining, by the computer system from the graph model, an input dependency model that is indicative of a set of inputs for the set of user-defined rules, a logical relationship among which is indicated by the graph model, wherein the input dependency model is useable by an orchestrator to coordinate accesses to one or more data stores in which the set of inputs is stored;
receiving, by the computer system from the one or more data stores, the set of inputs; and
determining, with the computer system, one or more automated decisions by applying the set of inputs to the graph model.

2. The computer-implemented method of claim 1, wherein the computer system implements an automated decision platform, and wherein the set of user-defined rules are stored as structured text written in a language that is specific to a context of the automated decision platform.

3. The computer-implemented method of claim 1, further comprising:
receiving, at the computer system, a set of user-defined functions useable by the computer service to supplement the user-defined rules;
wherein the graph model is generated from the set of user-defined rules and user-defined functions.

4. The computer-implemented method of claim 1, further comprising validating the set of user-defined rules, wherein the validating includes validating dependencies referred to by the set of user-defined rules.

5. The computer-implemented method of claim 1, wherein the input dependency model indicates, for each individual input of the set of inputs:
a name of the individual input,
a namespace of the individual input, and
a datatype of the individual input.

6. The computer-implemented method of claim 1, wherein the input dependency model is useable by the orchestrator to determine one or more of: an order in which to perform the accesses, which of the accesses can be performed in parallel, or how long the accesses will take to perform.

7. The computer-implemented method of claim 1, wherein receiving the set of inputs and determining one or more automated decisions is performed in a production computing environment, the method further comprising, replacing, at the production computing environment, the graph model with a second graph model for subsequent automated decision determination, wherein operations related to the replacing include:
receiving, at the computer system, a second set of user-defined rules;
validating, with the computer system, the second set of user-defined rules; and
generating, with the computer system, the second graph model from the second set of user-defined rules.

8. The computer-implemented method of claim 7, wherein the replacing does not include compiling the second set of user-defined rules.

9. The computer-implemented method of claim 1, wherein:
the set of user-defined rules are defined in a hierarchy including one or more rule packages at a first level of the hierarchy,
each rule package includes one or more individual rules at a second level of the hierarchy, there is no dependency between individual rules in a same rule package, and
the graph model is a directed acyclic graph model.

10. The computer-implemented method of claim 1, wherein the one or more automated decisions include a prediction of whether a particular transaction request is fraudulent, and wherein the one or more automated decisions include determining a recommendation for a product or service.

11. A non-transitory, computer-readable medium storing instructions that when executed by a computer system cause the computer system to perform operations comprising:
receiving, at a computer system, a set of user-defined rules, wherein the user-defined rules are useable by a computer service to automate a decision flow, wherein the decision flow is associated with determining whether to permit completion of an electronic transaction, and wherein determining whether to permit the completion of the electronic transaction includes determining whether to permit the electronic transaction to be processed by the computer system or to present recommendations to a user of the computer system regarding whether to permit the completion of the electronic transaction;
receiving, at the computer system, a set of user-defined functions useable by the computer service to supplement the user-defined rules;
generating, with the computer system from the set of user-defined rules and the set of user-defined functions, a graph model, wherein the graph model is generated without compiling the set of user-defined rules and the set of user-defined functions; and
determining, by the computer system from the graph model, an input dependency model that is indicative of a set of inputs for the set of user-defined rules, a logical relationship among which is indicated by the graph model, wherein the input dependency model is useable to an orchestrator to coordinate accesses to one or more data stores in which the set of inputs is stored;
wherein one or more automated decisions are determinable by applying the set of inputs to the graph model.

12. The non-transitory, computer-readable medium of claim 11,
wherein the set of user-defined rules are input by a user as structured text; and
wherein generating the graph model from the set of user-defined rules includes parsing the structured text to identify indications of one or more inputs, one or more conditions, and one or more actions.

13. The non-transitory, computer-readable medium of claim 11, wherein the generating and the determining include neither compiling the user-defined rules nor compiling the user-defined functions.

14. A computer-implemented method comprising:
receiving, at a multi-tenant computer system of an automated decision platform, a set of user-defined rules written as structured text in a language specific to a context of the automated decision platform, wherein the user-defined rules are useable by a computer service to automate a decision flow, wherein the decision flow is associated with determining whether to permit completion of an electronic transaction, and wherein determining whether to permit the completion of the electronic transaction includes determining whether to permit the electronic transaction to be processed by the multi-tenant computer system or to present recommendations to a user of the multi-tenant computer system regarding whether to permit the completion of the electronic transaction; and
performing, by an instance of an automated decision platform running on the multi-tenant computer system, an automated decision flow using the set of user-defined rules, wherein the performing includes:
generating, with the automated decision platform, a graph model from the set of user-defined rules;
receiving, with the automated decision platform, a set of inputs referred to in the graph model; and
determining, with the automated decision platform, one or more automated decisions by applying the set of inputs to the graph model.

15. The method of claim 14, wherein a plurality of nodes of the graph model take as input one or more respective ones of the set of inputs, and wherein applying the set of inputs to the graph model includes inputting the respective ones of the set of inputs to the corresponding nodes.

16. The method of claim 14, further comprising:
performing, by a second instance of the automated decision platform running on the multi-tenant computer system, a second automated decision flow using a second set of user-defined rules.

17. The method of claim 14, wherein the set of user-defined rules was input to a third instance of the automated decision platform running on a user device, wherein the set of user-defined rules was validated by the third instance of the automated decision platform prior to the receiving, and wherein the multi-tenant computer system and the user device run different operating systems.

18. The computer-implemented method of claim 1, wherein the user-defined rules are stored as structured text, and wherein generating, with the computer system, the graph model includes determining:
- where the user-defined rules begin and end in the structured text;
- a sequence in which to apply the user-defined rules;
- one or more inputs associated with the user-defined rules; and
- input and output dependencies among the user-defined rules.

19. The computer-implemented method of claim 1, wherein the input dependency model is useable by the orchestrator to determine which of the accesses can be performed in parallel.

20. The computer-implemented method of claim 14, wherein generating the graph model does not include compiling the user-defined rules.

* * * * *